Figure 1:
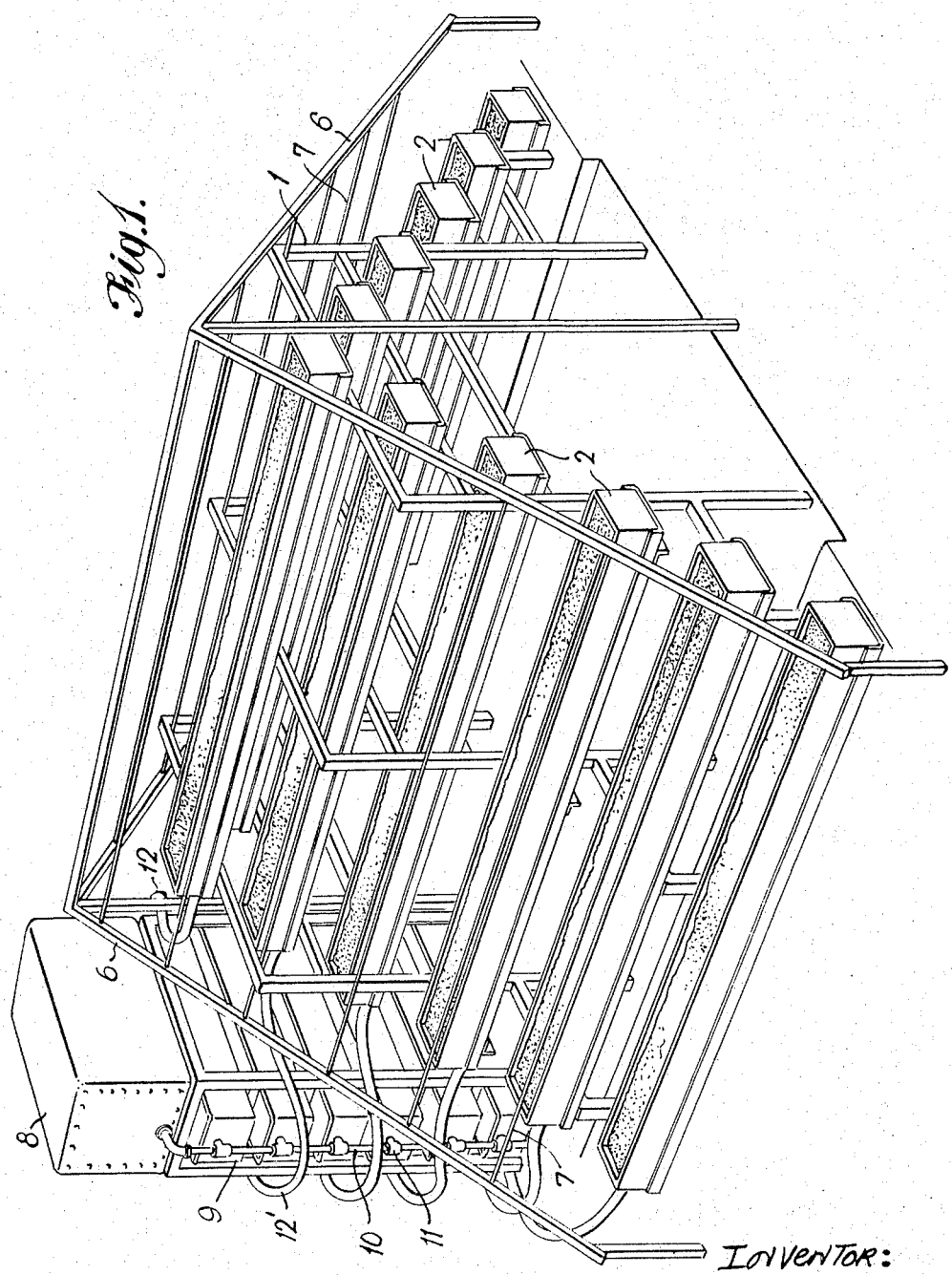

Inventor:
Allen John Cooper
By: Jacobs & Jacobs
His Attorneys

United States Patent Office 3,365,840
Patented Jan. 30, 1968

3,365,840
CROP GROWING DEVICE
Allen John Cooper, West Worthing, Sussex, England, assignor to National Research Development Corporation, London, England, a corporation of Great Britain
Filed Nov. 15, 1965, Ser. No. 507,838
Claims priority, application Great Britain, Nov. 13, 1964, 46,373/64
4 Claims. (Cl. 47—34.12)

This invention relates to equipment for the growth of glasshouse crops. Primarily the invention is concerned with a technique and a device for growing tomatoes and will, for convenience, be hereinafter described with reference to tomato growing, although many other applications of the invention will be readily apparent to those engaged in horticulture.

In recent years the single truss technique for the growth of tomatoes has attracted attention as a result of its economic advantages over the more conventional method of growth. However, the labor costs of the method as at present practised are still substantial and economies are desirable. For example, according to that method the crop is grown in soil beds in the ground and great expense is incurred in sterilizing the soil (by steam injection) to a sufficient depth before the crop is planted. Again, the crop requires considerable attention as growth proceeds and it is necessary for the operator to move along the rows of plants on frequent occasions with the consequent danger that local virus infection present may be spread throughout the whole of the crop.

It has now been found that the above-mentioned disadvantages of the present method of single truss growth may be to a large extent eliminated and additional benefits obtained by a new method of growth using a crop growing device which will be described more fully hereinafter.

The present invention comprises a method of growing tomatoes and other glasshouse crops in which the crop is raised in a plurality of elongated containers for soil, peat or other growth medium arranged in tiers in generally stepwise formation, the tiers being transversely spaced at an appropriate distance for the crop being grown. In operating the method the crop is continually watered and if necessary supplied with nutrients added to the water supply, by means of a system connected to irrigation pipes located in the growth medium containers in either the upper or lower half of the bed of growth medium as desired. Before the seeds or small plants are placed in the growth medium the latter is preferably sterilized by means of steam and advantageously the irrigation pipes are adapted for this purpose by being fabricated in suitable resistant material, e.g., polypropylene, and being arranged with the appropriate couplings for connection to a steam injection supply.

The invention also includes apparatus for carrying out the method described above comprising a supporting structure upon which the elongated containers are mounted in the stepwise and spaced arrangement of tiers hereinbefore referred to. Conveniently such apparatus is constructed in units in each of which the tiers rise from approximately ground level to an uppermost level which is preferably well within the reach of an operator tending the growing crop. For example, the tiers may be arranged symmetrically rising from approximately ground level on both sides of such a unit to an uppermost level. In large scale operation a number of such units may be arranged in line, the containers in any one tier being served by a common irrigation pipe which extends along the production line and is provided with steam injection couplings at various positions along its length. In one suitable arrangement the individual containers which for convenience of manufacture are made in unit lengths may be connected together directly to form longer units.

The containers may be in the form of troughs of channel section or have generally tubular form containing openings through which the individual plants may grow. The material of construction for either of these kinds of container is preferably asbestos cement or fiberglass. If desired, the containers may be integrally formed with the main supporting structure of the apparatus but they are preferably detachable for ease of cleaning. It will usually be necessary to provide means for supporting the growing plants such as wires strung between end members of the structure and extending between the tiers.

The crop growing apparatus described above has the advantage of being compact and permits of considerable space saving as compared with the prior method of single truss growth, and this is of considerable advantage where $CO_2$ enrichment or crop heating either through the soil or by raising the atmospheric temperature is to be used. The system is also readily designed to enable the operator to attend to the growing plants without movement in between the rows.

It will be appreciated that the method and device described above are designed for use in a greenhouse or in a building having artificial lighting and heating. The invention therefore permits the cultivation of many crops in areas having a climate in which such crops cannot normally be grown. The device is especially adapted for tomato growing and is designed to exploit to the full the advantages of the single truss method of growth and to achieve with these fruits a greater number of crops per year than is otherwise possible. The reduction in handling achieved by the invention reduces the possibility of infection arising in the crop and minimizes its spread. Also, by producing more crops of shorter duration the effect of infection is economically less harmful.

Figure 2:
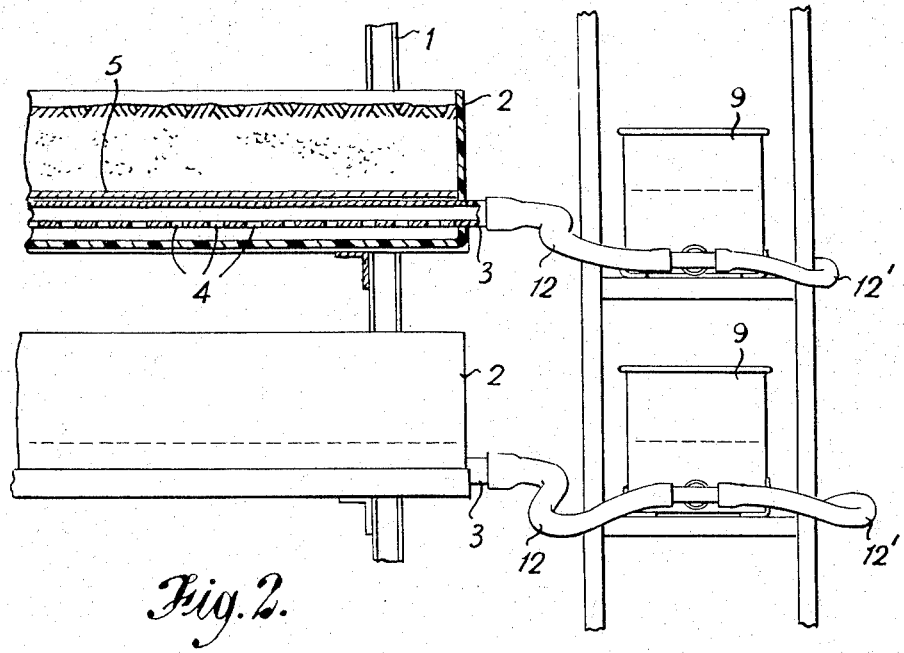
Figure 3:
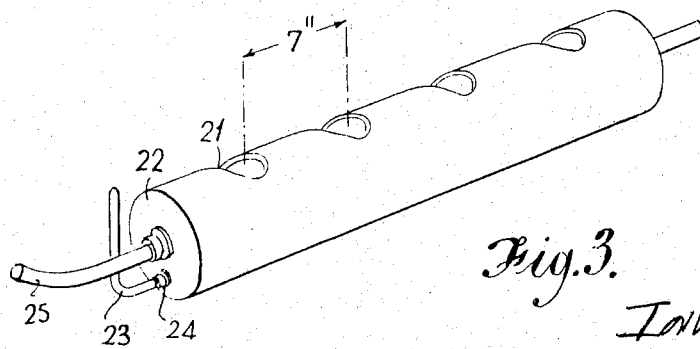

The invention will now be further described with reference to the accompanying drawings of which FIGURE 1 is a diagrammatic perspective view of the device coupled to a watering system; FIGURE 2 is a detailed view in section showing the disposition of the watering pipe in a trough; and FIGURE 3 is a perspective partial view of an alternative form of trough.

The device comprises a framework 1 shown in idealized manner and supporting eleven parallel troughs 2 in tiers. The troughs form an ascending series of steps on one side up to the highest trough and a descending series on the other side. The troughs 2 are removable from the framework 1 for the purpose of cleaning or replacement.

Each trough 2 is of square cross section and in the bottom half of the trough a supply pipe 3 is mounted extending the entire length of the trough 2. The pipe 3 has perforations 4 on its lower surface, and in order to prevent blockage of the perforations 4 and to support the soil bed, the pipe 3 is covered with a fibreglass strip 5 of the same width as the trough 2. The pipe 3 extends through the right-hand wall of the trough as shown in FIGURE 2 and is connected at the projecting end to an auxiliary watering system. Prior to connection to the watering system the pipes 3 may be connected to a steam supply to sterilise the soil beds above them in the troughs.

The framework 1 has end members 6 of inverted V-shape and between them are strung wires 7 running parallel to and in between the troughs 2. The wires 7 serve to support the growing plants and direct their growth upwards and clear of the trough at the next level.

The watering system comprises an uppermost tank 8 which feeds a series of secondary tanks 9 arranged vertically below it via a down pipe 10 and T-piece connection 11. The highest secondary tank 9 is connected through a rubber hose 12 to the supply pipe 3 of the highest trough 2. Proceeding downwards the next secondary tank 9 is connected through a T-piece 11 as shown in FIGURE 1 to the two troughs immediately below the highest trough hoses 12 and 12'. Succeeding secondary tanks 9 feed the next troughs at the corresponding level and so on.

The tanks 8 and 9 are provided with ballcock arrangements (not shown) so that watering proceeds automatically as water is drawn from the troughs by the plants by capillary action. Nutrient materials may be added to the tanks as desired.

If desired, tomato seed may be sown in the troughs and the seedlings thinned out, or seedlings produced elsewhere may be pricked off into the troughs.

When the first flower buds are visible the growing point and the auxiliary shoots are removed but no other attention is required until the ripe crop is picked ten to thirteen weeks after germination. Containment of root growth within the troughs tends to improve the quality of the fruit and three crops of excellent quality tomatoes may be obtained annually with this device. Other crops for which the device may be used include French beans, strawberries and some ornamentals.

The apparatus illustrated has eleven troughs. For tomato growing these preferably have a 7-inch square cross-section and are placed with their center lines 7 inches apart. If the lowest troughs are raised about 2 inches from ground level it is possible to mount two tiers side by side at the uppermost level and thereby increase the number of tiers to twelve while still within the reach of an operator of average height.

In a commercial apparatus the troughs may be formed in 5 foot units of guttering section either open-ended and bonded or bolted together end-to-end to form a continuous container or as sealed and units with O-ring joint connections to the common irrigation pipe.

Each container is preferably fitted with a water level indicator.

The units may be supported on a steel or concrete framework.

FIGURE 3 shows a tubular container 20 for growth medium having holes 21 of 2 to 3 inches diameter spaced at 7 inch centers from which the plants grow. The tube 20 has an end closure 22 at each end fitted with a water level indicating tube 23 inserted in a bung 24. An irrigation pipe 25 extends through the tube 20.

I claim:

1. Apparatus for growing tomatoes and other glasshouse crops comprising a supporting structure, a plurality of elongated containers for a growth medium carried by the supporting structure adapted for connection thereto, of means for supporting the growing plants and arranged in a stepwise formation of tiers transversely spaced to allow unimpeded growth of the crop in each container, irrigation means positioned in each container for sub-irrigation of growth medium when present therein and serving also as steam-injection means for sterilizing the medium in situ prior to use, each of said containers being arranged for connection to a water supply through means for maintaining a water-level in said container independently of other containers in said plurality whereby adjustment of the water-level therein is achieved automatically as growth of the crop therein proceeds.

2. Apparatus for growing tomatoes and other glasshouse crops which comprises a supporting structure,
a plurality of elongated containers for a growth medium arranged in tiers in generally stepwise formation mounted on the structure, the tiers being transversely spaced at an appropriate distance for the crop to be grown,
irrigation pipes in the growth medium containers below the growth medium, said pipes having openings to allow the passage of water therefrom,
a porous strip covering each pipe to prevent blockage of the openings therein and to support the growth medium, and
means for continually and automatically supplying water to said growth medium via the irrigation pipes.

3. Apparatus according to claim 2 in which the pipe covering strip is composed of fiberglass.

4. Apparatus according to claim 2 wherein there is a plurality of wires running parallel to and in between the elongated containers to support growing plants and direct their growth upwards and clear of the container at the next level.

References Cited

UNITED STATES PATENTS

| | | | |
|---|---|---|---|
| 875,235 | 12/1907 | Bastel | 47—34.12 |
| 1,555,675 | 9/1925 | Kruszynski | 47—38.1 |
| 3,172,234 | 3/1965 | Eavis | 47—1.2 |
| 2,062,755 | 12/1936 | Lyons et al. | 47—38.1 |
| 2,086,451 | 7/1937 | Vetter | 47—45 |
| 2,798,768 | 7/1957 | Babin. | |

FOREIGN PATENTS

| | | |
|---|---|---|
| 62,922 | 5/1864 | France. |
| 192,078 | 10/1937 | Switzerland. |
| 250,018 | 3/1948 | Switzerland. |
| 2,395,625 | 7/1925 | Australia. |
| 1,150,840 | 8/1957 | France. |

ROBERT E. BAGWILL, *Primary Examiner.*

R. CARTER, *Assistant Examiner.*